US011097961B1

(12) United States Patent
Jones

(10) Patent No.: US 11,097,961 B1
(45) Date of Patent: Aug. 24, 2021

(54) PHARMAIONIZER SYSTEM

(71) Applicant: John D. Jones, Phoenix, AZ (US)

(72) Inventor: John D. Jones, Phoenix, AZ (US)

(73) Assignee: John D. Jones Engineering, Inc., Phoenix, AZ (US)

( * ) Notice: Subject to any disclaimer, the term of this patent is extended or adjusted under 35 U.S.C. 154(b) by 0 days.

(21) Appl. No.: 16/780,350

(22) Filed: Feb. 3, 2020

Related U.S. Application Data

(60) Provisional application No. 62/879,006, filed on Jul. 26, 2019.

(51) Int. Cl.
| C02F 1/38 | (2006.01) |
| C02F 1/24 | (2006.01) |
| B03D 1/14 | (2006.01) |
| C02F 1/32 | (2006.01) |
| C02F 1/02 | (2006.01) |
| C02F 101/30 | (2006.01) |

(52) U.S. Cl.
CPC .......... *C02F 1/385* (2013.01); *B03D 1/1418* (2013.01); *C02F 1/02* (2013.01); *C02F 1/24* (2013.01); *C02F 1/32* (2013.01); *C02F 2101/30* (2013.01)

(58) Field of Classification Search
CPC ................. B03D 2203/008; B04C 2009/008
See application file for complete search history.

(56) References Cited

U.S. PATENT DOCUMENTS

| 5,273,572 A * | 12/1993 | Baker ................. B01D 5/0057 |
| | | 95/254 |
| 6,180,014 B1 * | 1/2001 | Salama ................. C02F 1/325 |
| | | 210/748.12 |
| 9,150,435 B1 * | 10/2015 | Jones ................. B01D 19/0005 |
| 9,975,060 B2 | 5/2018 | Jones ....................... B01D 3/06 |
| 2004/0107836 A1 * | 6/2004 | Yi ....................... B01D 19/0057 |
| | | 95/245 |
| 2014/0346114 A1 * | 11/2014 | Trembly ................... C02F 9/00 |
| | | 210/665 |

* cited by examiner

*Primary Examiner* — David C Mellon
(74) *Attorney, Agent, or Firm* — Invention To Patent Services; Alex Hobson

(57) ABSTRACT

Water contaminated with antibiotics, pharmaceuticals, microorganisms and other organic material stripped of these contaminating products with a specialized gas sparged hydrocyclone apparatus using an ozone containing gas as the stripping gas. The stripping gas contains 50-98 volume percent ozone, and the contaminated water is exposed to UV light prior to introduction into the sparger.

18 Claims, 5 Drawing Sheets

PHARMAIONIZER SYSTEM

CROSS REFERENCE TO RELATED APPLICATION

This application claims benefit of U.S. Provisional Application Ser. No. 62/879,006, filed Jul. 26, 2019, the entire disclosure of which is incorporated herein by reference.

FIELD OF THE INVENTION

The present application relates to purification of various liquids, particularly water. The application has particular utility in connection with purification of water containing antibiotics, pharmaceuticals, microorganisms and other organic materials contaminants from lake water, water ways, rivers and hospital waste water, and will be described in connection with such utility, although removal and disposal of water from other sources such as manufacturing, food preparations, farming, etc. are contemplated

BACKGROUND OF THE INVENTION

Purification and remediation of water containing antibiotics, pharmaceuticals, microorganisms and other organic material contaminants can be complex, expensive, and environmentally challenging. Various devices and methods have been developed over the years to solve or aid these challenges and concerns. Removal of pharmaceuticals, antibiotics, microorganisms and other organic material contaminants from lake water, water ways, rivers, and hospital waste and other sources such as manufacturing, food preparation and farming, etc., is becoming more and more of a problem. Current methods and apparatus for cleaning antibiotics, microorganisms, pharmaceuticals and other organic material contaminants from water typically utilize carbon as an absorbent. However, utilization of carbon as an absorbent is inefficient, and cannot be used for economically cleaning large quantities of contaminated water.

In my prior U.S. Pat. No. 9,975,060, I describe a method and apparatus for cleansing water contaminated with hydrocarbons, hydraulic fracturing fluids, volatile organic compounds, sulfur compounds, crude oil and other petroleum products utilizing a gas sparged hydrocyclone apparatus.

FIGS. 1-3 correspond to FIGS. 1-3 of my prior U.S. Pat. No. 9,975,060 (my '060 patent). As discussed in my aforesaid '060 patent, water contaminated with hydrocarbons, such as hydraulic fracturing fluids, volatile organic compounds, sulfur, hydrogen sulfide, hydrogen sulfide ions, crude oil, or other petroleum products is flowed in a feed conduit 12 to a specialized gas sparged hydrocyclone unit 20.

Appropriate sensors, such as temperature, pressure, and flow rate, and valves, indicated respectively by T, P, F, and V, are associated with the various elements of the apparatus 10. Other appropriate valves and related equipment, not shown, are also associated with the conduit 12. Sensors and other control devices may be added as desired.

The hydrocyclone unit 20 includes a hydrocyclone top 22 disposed at the top of a rigid container 24. The rigid container 24 can have many forms including, but not limited to, straight and/or curved tubes of various cross-sections, spheres, cubes, rectangular boxes, cylinders, ovoids, and combinations thereof. The rigid container can be made of a variety of materials including, but not limited to, metals, ceramics, polymers, composites, and combinations thereof. A preferred material for the rigid container 24 is steel. The conduit 12 is connected to the hydrocyclone top 22. Within the rigid container 24 is a sparger 34. The rigid container 24 and the sparger 34 are secured to a first reservoir, "underflow drum," or "residual disengagement vessel" 60 positioned beneath, or under, the rigid container 24 and sparger 34 combination.

Sparger 34 is located within the rigid container 24. The inner diameter of the rigid container 24 is greater than the outer diameter of the sparger 34. Between the sparger 34 and the rigid container 22 is a plenum 36. A stripping gas inflowing from a conduit 50 and manifold 52 flows into the plenum 36 under pressure through at least one input conduit, runner, or inlet. Preferably, a plurality of input conduits, runners, or inlets is used. Three such input conduits, runners, or inlets 26, 28 and 30 are illustrated in FIG. 1. Gas flow to the rigid container 24 from the manifold 52 may vary in accordance with the flow rate in the feed conduit 12 of contaminated water. As described in my aforesaid '060 patent the stripping gas in the conduit 50 may be air, or may comprise oxygen, carbon dioxide, nitrogen, argon, helium, or other appropriate gas. The sparger 34 is porous to the flow of a desired stripping gas. The positive pressure in the plenum insures the inwardly flowing stripping gas moves through the pores in the sparger 34 relatively uniformly along the length of the sparger. Movement of the stripping gas through the sparger 34 mixes the stripping gas with a downward spiraling flow of the contaminated water. In preferred embodiments, the sparger 34 is porous through the entire sintered tube. Initially, stripping gas from the conduit 50 flows through one or more inlets of the rigid container 24 into the plenum 36. The stripping gas is at a pressure sufficient to cause the stripping gas to flow through the pores of the sparger 34. As the stripping gas flows from the plenum 36 through the pores in the sparger 34, the gas enters a chamber 42 in an interior area of the sparger.

As described in my aforesaid '060 patent, the hydrocyclone top 22 induces a swirling or spiraling motion in the downwardly flowing contaminated water to form a vortex. As the stripping gas enters the interior area of the sparger in the presence of contaminated water, numerous gas bubbles are formed. The gas bubbles mix with the hydrocarbons, hydraulic fracturing fluids, volatile organic compounds, sulfurs, hydrogen sulfides, hydrogen sulfide ions, crude oils, or other petroleum products in the contaminated water. As a result, a froth or foam is formed in the interior area of the sparger 34. The froth or foam contains a mixture of liquid water and hydrocarbon, hydraulic fracturing fluid, volatile organic compound, sulfur, hydrogen sulfide, hydrogen sulfide ion, crude oil, or other petroleum product contaminants.

A vacuum pump or blower 92 in the conduit 90 draws a negative pressure or partial vacuum, typically about six (6) inches of mercury (Hg) to be generated in the second reservoir, overflow vessel, separator, surge vessel, or drum 80. The negative pressure or partial vacuum extends into conduit 70 through the hydrocyclone head 22 and into the interior of the sparger 34. With the application of negative pressure or partial vacuum, the froth or foam flows upwardly in the sparger, out of the hydrocyclone top 22, through a vortex finder or upper nozzle 32 in the hydrocyclone top 22, and into a conduit 70. The upwardly flowing frothy or foamy mixture of residual water and contaminates flows through the conduit 70 to a second reservoir, overflow vessel, separator, surge vessel, or drum 80. As the froth or foam enters the second reservoir, the froth or foam collapses or otherwise disintegrates under the influence of negative pressure or partial vacuum present in the second reservoir.

As the froth or foam collapses or disintegrates in the second reservoir, residual liquid water and any dissolved, suspended, admixed, or emulsified materials separate from the foam or froth and drop to a bottom portion of the second reservoir, overflow vessel, separator, surge vessel, or drum 80. The residual water and any dissolved, suspended, admixed, or emulsified materials flows outwardly from the bottom portion of the second reservoir, overflow vessel, separator, surge vessel, or drum 80 through a regulated conduit 84 for appropriate disposition. Large arrows by the respective conduits in FIG. 1 show the direction of flow of the various materials.

As residual liquid water and any dissolved, suspended, admixed, or emulsified materials separate from the disintegrating or collapsing froth or foam, the hydrocarbon, hydraulic fracturing fluid, volatile organic compound, sulfur, hydrogen sulfide, hydrogen sulfide ion, crude oil, or other petroleum product contaminants also separate from the froth or foam, occupy an upper portion of the second reservoir apart from the liquid water residing in the bottom of the second reservoir, and exit the upper portion of the second reservoir through an opening or conduit 90 where these and other volatile and/or gaseous materials are recovered for appropriate disposal or use.

The negative pressure or partial vacuum in the second reservoir, overflow vessel, separator, surge vessel, or drum 80 also helps to disengage any remaining volatizable products from liquid water residing in the bottom portion of the second reservoir, overflow vessel, separator, surge vessel, or drum 80.

The downwardly flowing water, minus the contaminating hydrocarbons, hydraulic fracturing fluids, volatile organic compounds, sulfur, hydrogen sulfides, hydrogen sulfide ions, crude oils, or other petroleum products which have been captured in the upwardly flowing froth or foam within the sparger 34, freely flows into a first reservoir, "underflow drum," or "residual disengagement vessel" 60 through an unrestricted opening in the bottom, or lower, end 44 of the sparger 34. Liquid water substantially free of hydrocarbons, hydraulic fracturing fluids, volatile organic compounds, sulfur, hydrogen sulfides, hydrogen sulfide ions, crude oils, or other petroleum products flows out of the first reservoir, "underflow drum," or "residual disengagement vessel" 60 through a conduit 62 and returns to a storage tank (not shown). An appropriate level of cleansed or purified liquid water is maintained in the first reservoir, "underflow drum," or "residual disengagement vessel" 60 by controlling outflow of the cleansed or purified liquid water into the conduit 62. The liquid water level in the first reservoir, underflow drum, or residual disengagement vessel 60 is indicated by reference numeral 64.

The flow of the froth or foam from the chamber within the sparger 34 is dynamically moved due to the differential pressure between the first reservoir, "underflow drum," or "residual disengagement vessel" 60 and the second reservoir, overflow vessel, separator, surge vessel, or drum 80.

The apparatus 10, including the hydrocyclone unit 20, with its hydrocyclone top 22, the rigid container 24, and the upper nozzle or vortex finder 32, the first reservoir, "underflow drum," or "residual disengagement vessel" 60, second reservoir, overflow vessel, separator, surge vessel, or drum 80, and the various conduits comprise a sealed system.

The generally spiraling downward liquid flow in the sparger 34 is schematically illustrated in FIG. 1 by arrows and the generally upwardly flow of the foam or froth is also schematically illustrated in FIG. 1 by arrows. Similarly, the flow of the stripping gas through the pores in the sparger is schematically illustrated in FIG. 1 by small arrows. FIG. 3 which corresponds to FIG. 3 of my aforesaid '060 patent is a schematic illustration showing a source of contaminated water (e.g., sour water), a conduit transporting contaminated water to the gas reactor, a source of stripping gas and accompanying manifold and gas inlets, a first reservoir (residual disengagement vessel), an outlet from the first reservoir, a conduit connecting the gas reactor to a second reservoir (separator or surge drum), a conduit connected to a blower (i.e., a source of negative pressure or partial vacuum), and an outflow conduit for the second reservoir. Various meters or gauges and valves or regulators are also illustrated. Arrows in FIG. 3 show the direction of flow of contaminated water, stripping gas, froth or foam, and reaction products in the system.

FIG. 2 which also originates from my aforesaid '060 patent is an enlarged view in partial section through the sparger 34 of FIG. 1. For the following discussion, reference will primarily be made to FIG. 2, but reference will also be made to FIG. 1.

The sparger 34 comprises a tube or pipe made of one or more porous materials. Suitable materials for the sparger 34 include, but are not limited to, sintered metallic particles, porous high density polyethylene, porous foil mesh, porous ceramic membrane made from aluminum oxide and/or silicon carbonate membrane. Preferred sintered metallic particles are stainless steel. The pores in the sintered tube are of such a size as to permit the flow of a gas through the tube or pipe and into the interior of the sparger element, but not permit liquids to pass therethrough when gas is flowing through the sparger. Pores in the sintered tube range in size from about five microns (5 μm) to about eighty microns (80 μm), preferably from about 15 microns (15 μm) to about 45 microns (45 μm), or from about fifteen microns (15 μm) to about twenty-five microns (25 μm), or from about twenty-five microns (25 μm) to about forty microns (40 μm), or from about thirty microns (30 μm) to about forty-five microns (45 μm), or from about thirty-five microns (35 μm) to about forty microns (40 μm).

Referring to FIG. 2, the sparger 34 also includes a pair of plates, a top plate 38 and a bottom plate 40. The plates 38 and 40 are outwardly extending flanges which provide the elements for sealing and securing the sparger to the hydrocyclone head 22, the rigid container 24, and the first reservoir, "underflow drum," or "residual disengagement vessel" 60.

While the apparatus described in my '060 patent has substantial utility for cleaning water contaminated with hydrocarbons, hydraulic fracturing fluids, volatile organic compounds, sulfur compounds, crude oil and other petroleum products, when it comes to removing antibiotics, microorganisms, pharmaceuticals, and other organic material contaminants from water contaminated with hospital waste water or waste water from animal and food processing facilities and other manufacturing facilities having high organic matter loading contaminations and from lake water, water ways and rivers containing such contaminants the apparatus described in my '060 patent is less effective. That is to say, for cleansing water contaminated with antibiotics, pharmaceuticals, microorganisms, and other organic material contaminants something more is needed.

SUMMARY OF THE INVENTION

Accordingly, in order to cleanse water contaminated with antibiotics, pharmaceuticals, microorganisms and other organic material contaminants, I have found we need to add additional equipment and steps to the system. For one, ozone ($O_3$) must be added to the stripping gas. The amount of ozone added to the stripping gas preferably may be from 50-98 volume percent, more preferably 60, 70, 80 or 90-95 volume percent.

Additionally, the contaminated water should be exposed to UV light and heated before it is introduced into the sparger. With these additional steps and processes, water contaminated with antibiotics, pharmaceuticals, microorganisms and other organic material contaminants may be efficiently and economically cleansed and purified of its contaminants.

In one aspect there is provided a method of removing antibiotics, pharmaceuticals, microorganisms and other organic material contaminates from water comprising the steps of: providing a hydrocyclone unit including: a hydrocyclone top; a rigid container disposed beneath said hydrocyclone top; a sparger in said rigid container; a plenum between said rigid container and said sparger; a first reservoir beneath said sparger; wherein said sparger has an open end in unrestricted fluid communication with said first reservoir; a conduit having one end in fluid communication with an upper outlet of said hydrocyclone top and an opposite end in fluid communication with a second reservoir; introducing a flow of the contaminated water to said hydrocyclone top and downwardly into said sparger, introducing a flow of stripping gas containing ozone to said plenum and into said sparger; mixing said stripping gas with the contaminated water in said sparger to provide a contaminant containing froth and water stripped of contaminants; capturing said contaminant containing froth from said hydrocyclone unit; separating stripping gas from said contaminant containing froth; disposing said stripping gas; and capturing said water stripped of contaminants from said sparger.

In a preferred aspect the contaminated water is heated prior to introduction into said sparger, and optionally recovering heat energy from the captured water stripped of contaminants, and recycling the recovered heat energy to the flow of contaminated water, and/or the contaminated water is exposed to UV light prior to introduction into said sparger.

Preferably the stripping gas is air containing ozone, or an inert gas selected from the group consisting of carbon dioxide, nitrogen, argon, helium and a mixture thereof, and ozone.

The present invention also provides a liquid purification apparatus comprising: a hydrocyclone top with an inlet for accepting and directing liquid into said hydrocyclone top; wherein said liquid inlet is attached to said hydrocyclone top at an angle relative to a center point in said hydrocyclone top; a rigid container disposed beneath said hydrocyclone top; a sparger in said rigid container; a plenum between said rigid container and said sparger, a source of pressured gas including ozone; at least one gas inlet in said rigid container in fluid communication with said source of pressurized gas and said plenum; wherein said sparger has a hollow interior area with an upper opening and a lower opening; a first reservoir in fluid communication with said lower opening of said sparger; a second reservoir in fluid communication with said upper opening of said sparger, and a source of negative pressure connected to said second reservoir.

In a preferred embodiment, the apparatus includes a heater for heating said liquid upstream of said liquid inlet, and optionally including a heat exchanger for recovering heat energy from the purified liquid, and for recycling the heat energy to the contaminated liquid, and/or an UV light source for exposing said liquid to UV light upstream of said liquid inlet.

Preferably, the source of pressurized gas comprises air containing ozone, or an inert has selected from the group consisting of carbon dioxide, nitrogen, argon, helium and a mixture thereof, and ozone.

Also provided is a method of stripping antibiotics, pharmaceuticals, microorganisms and other organic material contaminates from water comprising the steps of: providing a hydrocyclone unit including: a hydrocyclone top; a rigid container disposed beneath said hydrocyclone top; a sparger in said rigid container, a plenum between said rigid container and said sparger; a first reservoir beneath said sparger; wherein said sparger has an open end in unrestricted fluid communication with said first reservoir, a conduit having one end in fluid communication with an upper outlet of said hydrocyclone top and an opposite end in fluid communication with a second reservoir, providing a flow of said contaminated water with to said hydrocyclone top and downwardly into said sparger, providing a flow of stripping gas containing ozone to said plenum and into said sparger, mixing said stripping gas with said contaminated water in said sparger to provide contaminant-containing froth and water stripped said contaminants; capturing said contaminant-containing froth from said hydrocyclone unit; separating stripping gas from contaminant-containing froth; disposing said stripping gas; and capturing said water stripped of said contaminants from said sparger.

In such embodiment the contaminated water preferably is heated prior to introduction into said sparger, and optionally recovering heat energy from the water stripped of contaminants and recycling the recovered heat energy to the flow of contaminated water, and/or is exposed to UV light prior to introduction into said sparger.

In such embodiment the stripping gas preferably comprises air containing ozone, or an inert gas selected from the group consisting of carbon dioxide, nitrogen, argon, helium and a mixture thereof, and ozone.

In another aspect of the invention there is provided a liquid purification apparatus comprising: a hydrocyclone top with an inlet for accepting and directing liquid into said hydrocyclone top; wherein said liquid inlet is attached to said hydrocyclone top at an angle relative to a center point in said hydrocyclone top; a rigid container disposed beneath said hydrocyclone top; a sparger in said rigid container; a plenum between said rigid container and said sparger; a source of pressurized gas including ozone; at least one gas inlet in said rigid container in fluid communication with said source of pressurized gas and said plenum; a first reservoir beneath said sparger, wherein said sparger has a hollow interior area in unrestricted fluid communication with said first reservoir, a second reservoir in fluid communication with said hollow interior area of said sparger; and a vacuum pump attached to said second reservoir.

In such aspect the liquid purification apparatus preferably comprises a heater for heating said liquid upstream of said liquid inlet, and optionally including a heat exchanger for recovering heat energy from the purified liquid, and for recycling the heat energy to the contaminated liquid, and/or an UV light source for exposing said liquid to UV light upstream of said liquid inlet.

In such aspect the source of pressurized gas preferably comprises air containing ozone, or an inert gas selected from the group consisting of carbon dioxide, nitrogen, argon, helium and a mixture thereof, and ozone.

Finally the present invention provides a liquid purification apparatus comprising: a containment vessel having at least one rigid wall; a source of pressurized gas containing ozone; at least one gas inlet in fluid communication with said source of pressurized gas attached to said at least one rigid wall of said containment vessel; wherein said containment vessel has at least one hollow area therein; wherein said containment vessel has a first end and a second end; a rigid substantially cylindrical microporous tube with a hollow interior and an opening at each end; wherein said tube is positioned in said at least one hollow area of said containment vessel and hermetically sealed to said containment vessel at each end of said tube; a housing attached to said first end of said containment vessel; wherein said housing has an interior space delimited by a substantially curved inner wall; wherein said interior space has a center, an aperture in said substantially curved inner wall and a fluid inlet attached to said housing at an angle relative to a center point in said housing and in fluid communication with said aperture; a first outlet attached to said housing in fluid communication with said interior space; a second outlet attached to said housing at a substantially perpendicular angle and in fluid communication with said interior space; wherein said second outlet has a central axis substantially aligned with said center of said interior space; wherein said first outlet is positioned on said housing substantially opposite said second outlet; wherein said second outlet is in fluid communication with one opening of said tube; a first reservoir attached to said second end of said containment vessel and in fluid communication with an open end of said tube; a fluid conduit having two ends; wherein one end of said fluid conduit is attached to said first outlet and hermetically sealed thereto; wherein a second end of said fluid conduit is attached to an inlet of a second reservoir and hermetically sealed thereto; and wherein said second reservoir is attached to an inlet of a venturi vacuum system.

In such aspect the apparatus further comprises a heater for heating said liquid upstream of said liquid inlet, and optionally including a heat exchanger for recovering heat energy from the purified liquid, and for recycling the heat energy to the contaminated liquid, and/or an UV light source for exposing said liquid to UV light upstream of said liquid inlet.

In such aspect the source of pressurized gas preferably comprises air containing ozone, or an inert gas selected from the group consisting of carbon dioxide, nitrogen, argon, helium and a mixture thereof, and ozone.

BRIEF DESCRIPTION OF THE DRAWINGS

Further features of the advantages of the present invention may be seen from the following detailed description, taken in conjunction with the accompanying drawings, wherein like numerals depict like parts, and wherein.

DETAILED DESCRIPTION OF THE INVENTION

Figure 4:
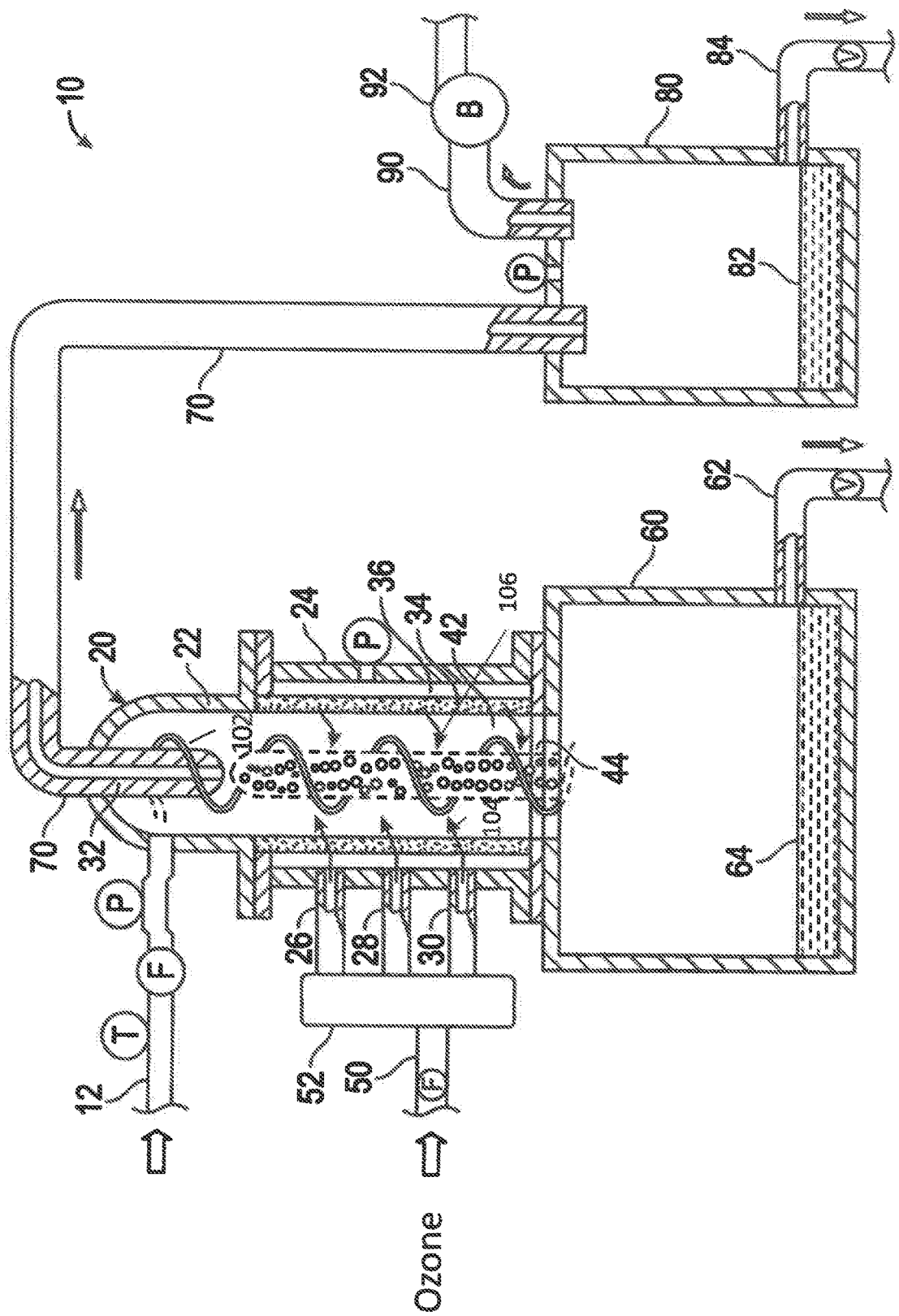
FIG. 4 illustrates a diagram, with elements in partial section, of an air hydrocyclone of the present invention.
Figure 5:
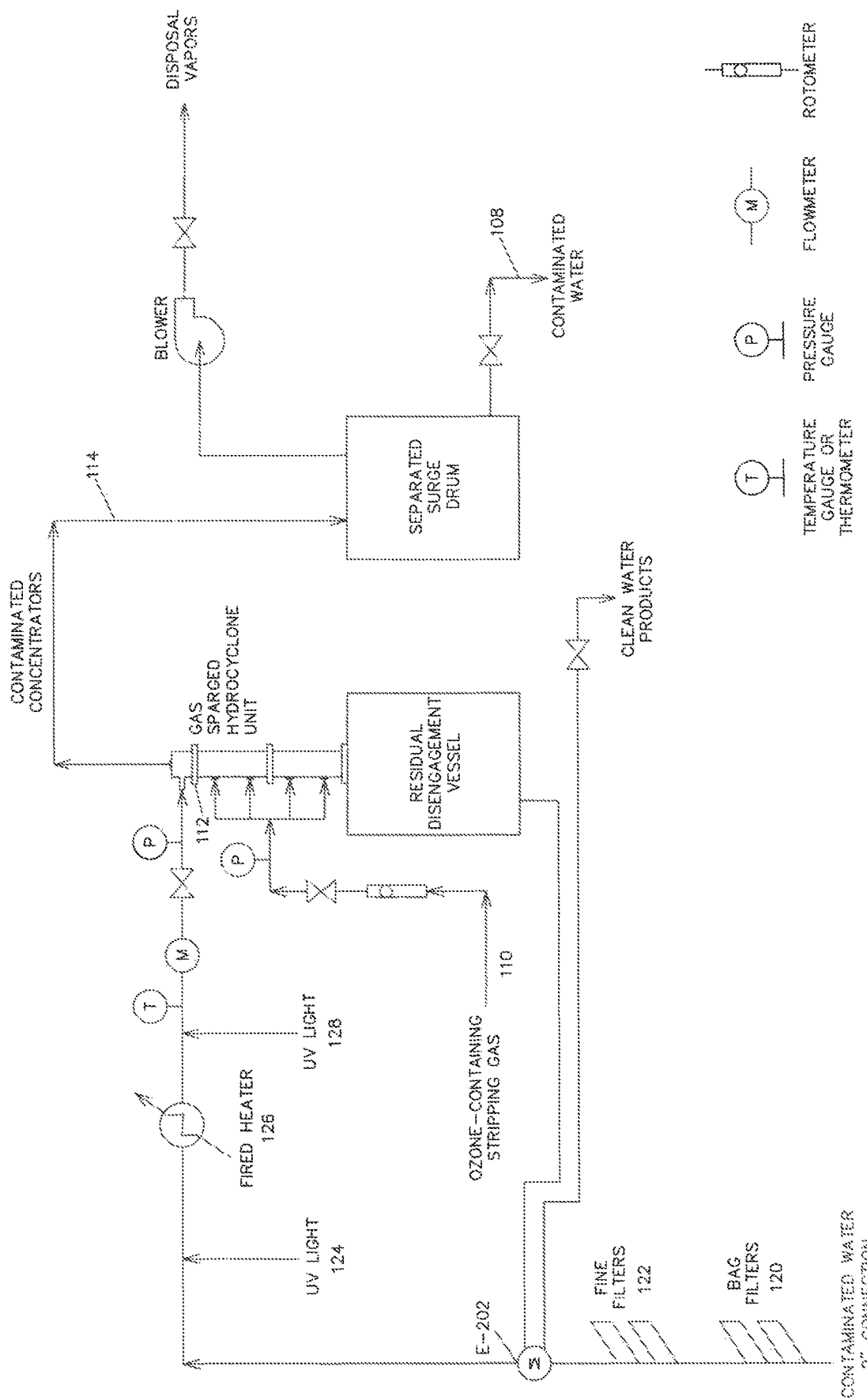
FIG. 5 is a schematic diagram of a system incorporating an apparatus of the present invention, associated equipment and indications of a method for using the apparatus in accordance with the present invention.

Referring to FIGS. 4 and 5, contaminated water, e.g., hospital waste water contaminated with antibiotics, pharmaceuticals and microorganisms is filtered, heated and exposed to ultra violet light as will be described below with reference to FIG. 5. The contaminated water is then flowed to a specialized gas sparger apparatus as shown in FIG. 4, of this invention. The sparger apparatus of FIG. 4 is similar to the sparger apparatus shown in FIGS. 1 and 2 above, and is comprised of a hydrocyclone top, or head portion, secured to a rigid container located below the hydrocyclone top. The hydrocyclone top has an inlet for accepting and directing contaminated liquid water into the hydrocyclone top, after the water is heated and subjected to UV light. The hydrocyclone top has two outlets, an upper outlet and a lower outlet. The lower outlet directs the contaminated liquid water from the hydrocyclone top downwardly into a sparger located below the hydrocyclone top. The upper outlet is positioned above the hydrocyclone unit. The upper outlet accepts and directs upwardly flowing contaminates and residual water out of the sparger and hydrocyclone combination.

Figure 1:
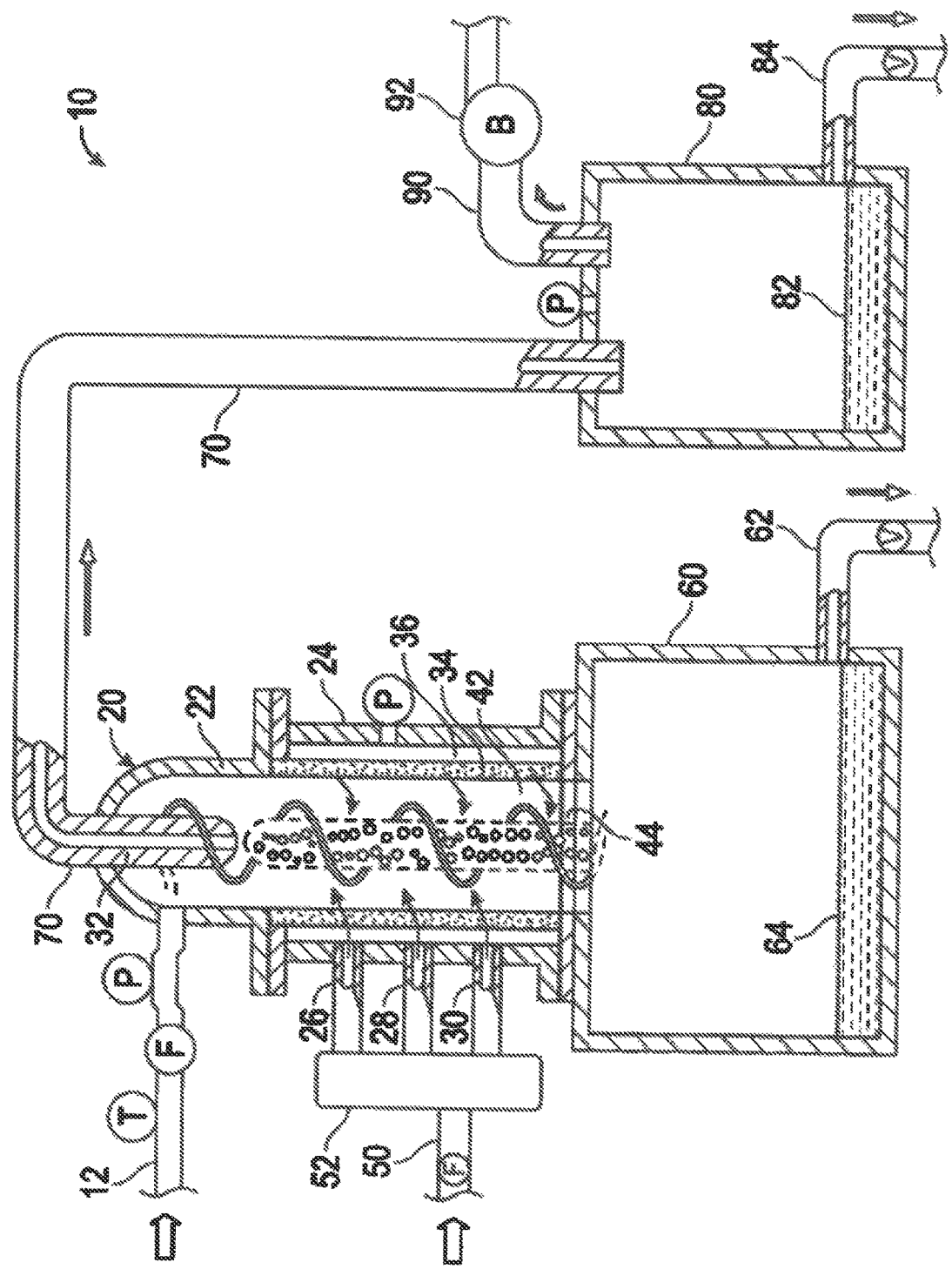
FIG. 1 is a diagram, with elements in partial section, of an air sparge hydrocyclone system to FIG. 1 of my prior '060 patent.
Figure 2:
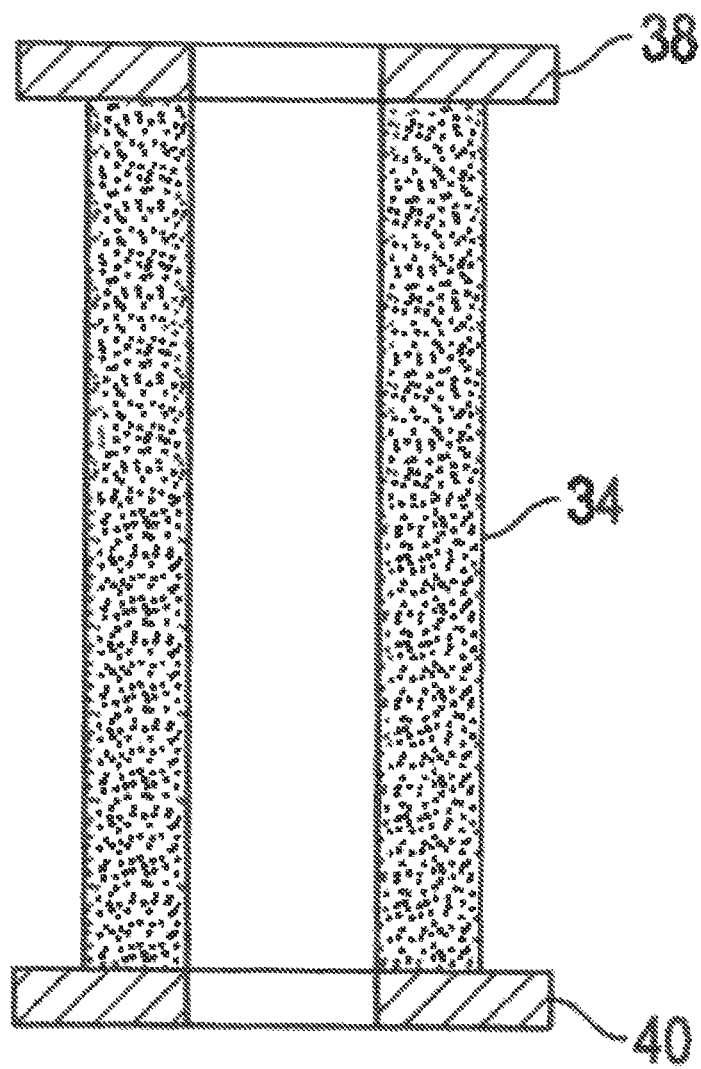
FIG. 2 is a cross-sectional view of an air sparger corresponding to FIG. 2 of my '060 patent.
Figure 3:
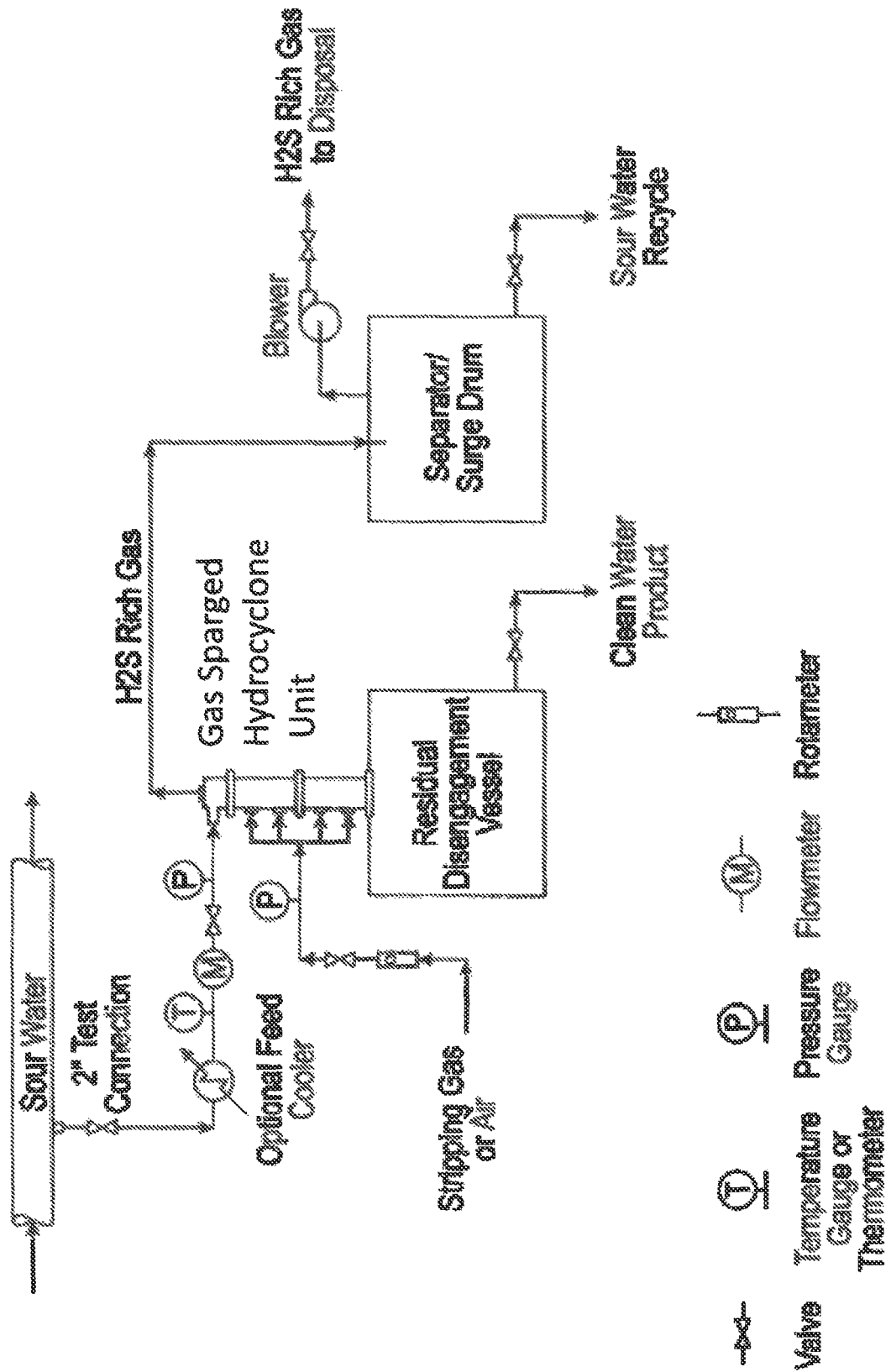
FIG. 3 is a schematic diagram corresponding to FIG. 3 of my '060 patent.

The sparger of FIG. 4 is similar to the sparger illustrated in FIGS. 1 and 2 of my aforesaid '060 patent. The sparger is a porous substantially cylindrical element positioned and retained inside the rigid container. In preferred embodiments, the sparger is made of sintered stainless steel. The rigid container has one or more inlets traversing one or more walls of the rigid container. The inlets are in fluid communication with a plenum positioned between inner walls of the rigid container and outer surfaces of the sparger. However, unlike the sparger of my aforesaid '060 patent, the sparger of the present invention includes a source of ozone-containing stripping gas, which may be an inline ozone generator, which is fed under pressure through the one or more inlets to the plenum. Once in the plenum, the ozone-containing stripping gas flows from the plenum through the pores of the sparger into a substantially cylindrical hollow interior area of the sparger. The hollow interior area of the sparger is located substantially in the center of the sparger. The hollow interior area of the sparger has an unrestricted opening at opposite ends, referred to herein as an upper opening and a lower opening. The unrestricted lower opening in a lower, or bottom, portion of the hollow interior area permits cleansed or purified water to directly flow out of the sparger into a first reservoir positioned beneath the rigid container. The upper unrestricted opening in the hollow interior area of the sparger is in fluid communication with a vortex finder, or upper nozzle, located in the upper outlet of the hydrocyclone top as noted in FIG. 4. In use, contaminants and residual water exit the sparger through the unrestricted upper opening and vortex finder. One end of a conduit is attached to the vortex finder. An opposite end of the conduit is attached to a second reservoir. Contaminants and residual water are conveyed from the sparger through the conduit to the second reservoir. A source of negative pressure or partial vacuum is provided to the second reservoir. The source of negative pressure or partial vacuum is in fluid communication with the hollow interior area of the sparger and the first reservoir. Regulated outlets are provided to the first reservoir and the second reservoir.

In a preferred embodiment of the process, as described in FIGS. 4 and 5, the contaminated liquid water after filtering, heating and exposure to UV light, is fed from a conduit through the inlet of the hydrocyclone top. Typically the contaminated water is heated to a temperature of 82-83° C. Ultraviolet light typically should be relatively short wave length, typically 100-280 nm which are particularly suited for germicidal utility. Heating the water increases the germicidal effect of the UV light exposure. The hydrocyclone top causes the incoming contaminated liquid water to acquire a circular flow and temporarily circulate within the hydrocyclone top. The circulating contaminated liquid water moves downwardly through the lower outlet of the hydrocyclone top in a spiraling or swirling fashion to form a vortex in the hollow interior area of the sparger. The ozone-containing stripping gas may comprise air or a gas that is inert such as carbon dioxide, nitrogen, argon. When the ozone-containing stripping gas passes, or percolates, into the hollow interior area of the sparger in the presence of contaminated liquid water, the ozone-containing stripping gas forms numerous bubbles in the contaminated water. The vortex aids in mixing the bubbles with the contaminated liquid water in the hollow interior area of the sparger. A froth or foam of ozone-containing stripping gas and contaminated liquid water is formed as a result of the mixing action. The contaminants are captured and separated from most or all of the contaminated liquid water by the bubbles in the froth or foam. Under the influence of negative pressure or partial vacuum present in the apparatus, a portion of the froth or foam collapses and transforms into a stream of liquid water substantially free of contaminants. Collapse of the froth or foam occurs above the bottom of the sparger. The stream of liquid water, stripped or otherwise substantially removed of contaminants, continues to flow downwardly through the unrestricted lower opening in the lower portion of the sparger directly into the first reservoir, or storage vessel, located beneath the hydrocyclone apparatus. Also with the aid of negative pressure or partial vacuum present in the apparatus, contaminate containing froth or foam flows upwardly in the hollow interior area of the sparger. The upwardly flowing contaminate-containing froth or foam flows out of the hollow interior area of the sparger through the vortex finder in the upper outlet in the hydrocyclone top an into the conduit. The contaminate containing froth or foam moves through the conduit into the separate second reservoir. Once in the second reservoir, the froth or foam completely disintegrates or collapses. The contaminate containing liquid water component of the froth or foam drops to a bottom portion of the second reservoir. The liquid water and any dissolved contaminates residing in the bottom of the second reservoir flow out of the second reservoir through a regulated opening or conduit in the bottom of the second reservoir for appropriate handling and disposal. As the froth or foam disintegrates in the second reservoir, antibiotics, pharmaceuticals, microorganisms, and other organic material contaminants present in the froth or foam separate from the froth or foam. Some of these materials enter a gaseous phase. The gaseous volatile compounds, antibiotics, pharmaceuticals, microorganisms, or other organic material contaminants which reside in an upper portion of the second reservoir separate from the liquid water present in the bottom portion of the second reservoir. A negative pressure or partial vacuum in the second reservoir can also remove volatilizable materials remaining in the liquid water.

In one embodiment the gas sparger cyclone system comprises a hydrocyclone top, a rigid container disposed beneath said hydrocyclone top, a sparger in said rigid container, a plenum between said rigid container and said sparger, at least one ozone-containing gas inlet in said rigid container in fluid communication with said plenum, a first reservoir beneath said sparger, wherein said sparger has a hollow interior area with an open end in unrestricted fluid communication with said first reservoir, a second reservoir in fluid communication with said hollow interior area of said sparger, and a vacuum pump in communication with said second reservoir.

In another embodiment the sparger cyclone systematic comprises a containment vessel having at least one rigid wall, at least one ozone-containing gas inlet attached to said at least one rigid wall of said containment vessel, wherein said containment vessel has at least one hollow area therein, wherein said containment vessel has a first end and a second end, a rigid substantially cylindrical microporous tube with a hollow interior and an opening at each end, wherein said tube is positioned in said at least one hollow area of said containment vessel and hermetically sealed to said containment vessel at each end of said tube, a housing attached to said first end of said containment vessel, wherein said housing has an interior space delimited by a substantially curved inner wall, wherein said interior space has a center, an aperture in said substantially curved inner wall and a fluid inlet attached to said housing at a angle relative to a center point in said housing and in fluid communication with said aperture, a first outlet attached to said housing in fluid communication with said interior space, a second outlet attached to said housing at a substantially perpendicular angle and in fluid communication with said interior space, wherein said second outlet has a central axis substantially aligned with said center of said interior space, wherein said first outlet is positioned on said housing substantially opposite said second outlet, wherein said second outlet is in fluid communication with one opening of said tube, a first reservoir attached to said second end of said containment vessel and in fluid communication with an open end of said tube, a fluid conduit having two ends, wherein one end of said fluid conduit is attached to said first outlet and hermetically sealed thereto, wherein a second end of said fluid conduit is attached to an inlet of a second reservoir and hermetically sealed thereto, and wherein said second reservoir is attached to an inlet of a vacuum system, preferably a venturi vacuum system.

The present invention also provides a method of stripping antibiotics, pharmaceutical, microorganism and other organic material contaminants from water comprising the steps of providing a hydrocyclone unit including a hydrocyclone top, a rigid container disposed beneath said hydrocyclone top, a sparger in the rigid container, a plenum between said rigid container and said sparger, a first reservoir beneath said sparger, wherein said sparger has an open end in unrestricted fluid communication with said first reservoir, providing a flow of pre-heated and UV light treated contaminated water to said hydrocyclone top and into said sparger, providing a flow of ozone-containing shipping gas to said sparger, mixing said ozone-containing shipping gas with said water in the sparger to provide a water containing froth and stripped water, capturing said water containing froth from said hydrocyclone unit, separating ozone stripping gas from said water containing froth, disposing of said ozone stripping gas, and capturing said water stripped of contaminated water from said sparger.

EXAMPLE

FIGS. 4 and 5 illustrate a method of removing pharmaceuticals, antibiotics, microorganisms, and other organic material contaminants from water using the sparger apparatus 10. Contaminated water is first subjected to particle filtration, UV light and heated, and the filtered, heated and UV light treated water is then flowed in a feed conduit 12 to the ozone-containing gas sparged hydrocyclone unit 20.

Appropriate sensors, such as temperature, pressure, and flow rate, and valves, indicated respectively by T, P, F, and V, are associated with the various elements of the apparatus 10, are not shown. Other appropriate valves and related equipment, not shown, which are also associated with conduit 12.

Unit 20 includes a hydrocyclone top 22 disposed at the top of a rigid container 24. The rigid container can be made of a variety of materials including, but not limited to, metals, ceramics, polymers, composites, and combinations thereof. A preferred material for the rigid container 24 is stainless steel. The conduit 12 is connected to the hydrocyclone top 22. Within the rigid container 24 is a sparger 34. The rigid container 24 and the sparger 34 are secured to a first reservoir, "underflow drum," or "residual disengagement vessel" 60 positioned beneath, or under, the rigid container 24 and sparger 34 combination.

As illustrated in FIG. 4, the sparger 34 is located within the rigid container 24. The inner diameter of the rigid container 24 is greater than the outer diameter of the sparger 34. Between the sparger 34 and the rigid container 22 is a plenum 36. Ozone-containing gas is flowed from a conduit 50 and manifold 52 into the plenum 36 under pressure through at least one input conduit, runner, or inlet. The ozone is created by an inline ozone generator, in communication with conduit 50. Preferably, a plurality of input conduits, runners, or inlets is used. Three such input conduits, runners, or inlets 26, 28 and 30 are illustrated in FIG. 4. Gas flow to the rigid container 24 from the manifold 52 may vary in accordance with the flow rate in the feed conduit 12 of heated contaminated water. The gas flow rate is measured in standard cubic feet per minute (scfm). Gas flow to the rigid container 24 from the manifold 52 may vary from, for example, about thirty five (35) scfm to about fifty (50) scfm, or greater. The sparger 34 is porous to the flow of the ozone-containing stripping gas at a pressure of 90 psig. The positive pressure in the plenum insures the inwardly flowing ozone stripping gas moves through the pores in the sparger 34 relatively uniformly along the length of the sparger. Uniform movement of ozone-containing stripping gas through the sparger 34 evenly mixes the ozone-containing stripping gas with a downward spiraling flow of contaminated water. In preferred embodiments, the sparger 34 is porous essentially through the entire sintered tube. Initially, ozone-containing stripping gas from the conduit 50 flows through one or more inlets of the rigid container 24 into the plenum 36. The ozone-containing stripping gas is at a pressure sufficient to cause the ozone-containing stripping gas to flow through the pores of the sparger 34. As the ozone-containing stripping gas flows from the plenum 36 through the pores in the sparger 34, the ozone-containing stripping gas enters a chamber 42 in an interior area of the sparger.

The hydrocyclone top 22 induces a swirling or spiraling motion in the downwardly flowing contaminated water to form a vortex. As the ozone-containing stripping gas enters the interior area of the sparger in the presence of contaminated water, numerous gas bubbles are formed. The gas bubbles contact the pharmaceuticals, antibiotics, microorganisms, and other organic materials, oxidizing, decomposing or neutralizing the contaminating materials in the contaminated water and/or binding to the contaminating materials. As a result, a froth or foam is formed in the interior area of the sparger 34. The froth or foam contains a mixture of liquid water and pharmaceuticals, antibiotics, microorganisms, and other organic contaminants.

A venturi vacuum system or blower 92 in the conduit 90 creates a negative pressure or partial vacuum to be generated in the second reservoir, overflow vessel, separator, surge vessel, or drum 80. The negative pressure or partial vacuum extends into conduit 70 through the hydrocyclone head 22 and into the interior of the sparger 34. With the application of negative pressure or partial vacuum, the contaminant products containing a portion of the froth or foam flows upwardly in the sparger, out of the hydrocyclone top 22, through a vortex finder or upper nozzle 32 in the hydrocyclone top 22, and into a conduit 70. The upwardly flowing frothy or foamy mixture of residual water and contaminates flows through the conduit 70 to a second reservoir, overflow vessel, separator, surge vessel, or drum 80. As the contaminant products containing froth or foam enters the second reservoir, the froth or foam collapses or otherwise disintegrates under the influence of negative pressure or partial vacuum present in the second reservoir.

As the froth or foam collapses or disintegrates in the second reservoir, residual liquid water and any dissolved, suspended, admixed, or emulsified materials separated from the foam or froth drop to a bottom portion of the second reservoir, overflow vessel, separator, surge vessel, or drum 80. The residual water and any dissolved, suspended, admixed, or emulsified materials flows outwardly from the bottom portion of the second reservoir, overflow vessel, separator, surge vessel, or drum 80 through a regulated conduit 84 for appropriate disposition. Large arrows by the respective conduits in FIG. 4 show the direction of flow of the various materials.

As residual liquid water and any dissolved, suspended, admixed, or emulsified material separate from the disintegrating or collapsing froth or foam, the contaminants also separate from the froth or foam, and occupy an upper portion of the second reservoir apart from the liquid water 82 residing in the bottom of the second reservoir, where the contaminants may be removed from the upper portion of the second reservoir through an opening or conduit 90 where contaminants are then recovered for appropriate recovery or disposal.

The negative pressure or partial vacuum in the second reservoir, overflow vessel, separator, surge vessel, or drum 80 also helps to disengage any remaining volatizable products from liquid water 82 residing in the bottom portion of the second reservoir, overflow vessel, separator, surge vessel, or drum 80.

The downwardly flowing water, minus the contaminating products which have been captured in the upwardly flowing froth or foam within the sparger 34, freely flows into a first reservoir, "underflow drum," or "residual disengagement vessel" 60 through an unrestricted opening in the bottom, or lower, end 44 of the sparger 34. Liquid water free of contaminating products flows out of the first reservoir, "underflow drum," or "residual disengagement vessel" 60 through a conduit 62 and returns to a storage tanks (not shown). An appropriate level of cleansed or purified liquid water is maintained in the first reservoir, "underflow drum," or "residual disengagement vessel" 60 by controlling outflow of the cleansed or purified liquid water into the conduit 62. The liquid water level in the first reservoir, underflow drum, or residual disengagement vessel 60 is indicated by reference number 64.

The flow of the froth or foam from the chamber within the sparger 34 is dynamically moved due to the differential pressure between the first reservoir, "underflow drum," or "residual disengagement vessel" 60 and the second reservoir, overflow vessel, separator, surge vessel, or drum 80.

The apparatus 10 of FIG. 4, including the hydrocyclone unit 20, with its hydrocyclone top 22, the rigid container 24, and the upper nozzle or vortex finder 32, the first reservoir, "underflow drum," or "residual disengagement vessel" 60, second reservoir, overflow vessel, separator, surge vessel, or drum 80, and the various conduits comprise a sealed system. The negative pressure or partial vacuum in the system typically is 6-12 inches of mercury (Hg) more preferably about six (6) inches of mercury (Hg).

The generally spiraling downward liquid flow in the sparger 34 is schematically illustrated in FIG. 4 by arrows 102 and the generally upward flow of the foam or froth is also schematically illustrated in FIG. 1 by arrows 104. Similarly, the flow of the ozone-containing stripping gas through the pores in the sparger is schematically illustrated in FIG. 4 by arrows 106. FIG. 5 illustrates the present invention in schematic form. Arrows 112 in FIG. 5 show the direction of flow of contaminated water 108, ozone-containing stripping gas 110, froth or foam, and concentrated contaminants 114 in the system, water inlet filtration, heat exchanger and ultra-violet light prior to the process liquid entering the FIG. 4, apparatus 10, which includes the hydrocyclone unit 20.

The sparger element has been described in conjunction with the stripping of antibiotics, pharmaceuticals, microorganisms and other organic material contaminants from hospital waste water, it will be understood that such sparger may also be used in other applications. Another application is for the removal of contaminates from water of volatile organic compounds such as petroleum products.

By way of non-limiting example, a contaminated hospital water enters the system through a two inch (2.0") diameter portal. Prior to entering the process plant, a first bag 120 filter, removes larger particles from the water, while a second bag filter 122, removes fine particles in the water, typically 5-8 MM size particles. The water progresses through the bag filters 120, 122. The filtered contaminated water can be heated by a heat exchanger 202 in contact with the clean water product stream from the residual disengagement vessel as will be described below. After the heat is removed from the clean water product by the heat exchanger 202, the clean water product stream is discharged to the clean water storage. After the second bag filter 122 the partially heated water is exposed to the first ultra violet light source 124 of 226 nm. The filtered US light treated water then enters secondary fired heater 126 which increases the water temperature to 82° C. preferably 82° C. to 83° C. After the water is secondarily heated, the water is exposed to the second ultra violet light source 128 of 270 nm. The heated UV treated water then enters sparger hydrocyclone system where it is exposed to ozone-containing air (90 to 95 $O_3$ volume percent) as described in detail above in the discussion of FIGS. 4 and 5, wherein clean water is separated from the contaminated water as previously described.

Changes and modifications may be made in the foregoing invention without departing from the spirit and scope. Thus, it is intended that the present invention cover the modifications and variations of this invention provided they come within the scope of the appended claims and varied equivalents.

What is claimed is:

1. A method of removing contaminates from water comprising the steps of:
   providing a hydrocyclone unit including:
      a hydrocyclone top;
      a rigid container disposed beneath said hydrocyclone top;
      a sparger in said rigid container;
      a plenum between said rigid container and said sparger;
      a first reservoir beneath said sparger;
   wherein said sparger has an open end in unrestricted fluid communication with said first reservoir;
   providing a conduit having one end in fluid communication with an upper outlet of said hydrocyclone top and an opposite end in fluid communication with a second reservoir;
   introducing a flow of contaminated water to said hydrocyclone top and downwardly into said sparger;
   introducing a flow of stripping gas containing ozone to said plenum and into said sparger;
   mixing said stripping gas with the contaminated water in said sparger to provide a contaminant containing froth and water stripped of contaminants;
   capturing said contaminant containing froth from said hydrocyclone unit;
   separating stripping gas from said contaminant containing froth;
   disposing said stripping gas; and
   capturing said water stripped of contaminants from said sparger to produce a clean water product;
   providing a heater and heating the contaminated water prior to introduction into said sparger;
   providing an ultraviolet light source that produces ultraviolet light;
   and exposing the contaminated water to said ultraviolet light prior to introduction into said sparger, and
   wherein the contaminated water is heated by said heater prior to being exposed to the ultraviolet light.

2. The method of claim 1, wherein heat energy from clean water product is recovered as recovered heat energy.

3. The method of claim 1, wherein the stripping gas is further includes air, or an inert gas selected from the group consisting of carbon dioxide, nitrogen, argon, helium and a mixture thereof.

4. The method of claim 1, wherein the stripping gas comprises 50-98 volume percent ozone.

5. The method of claim 1, wherein the contaminated water is heated to at least 82° C.

6. A liquid purification apparatus comprising:
   a hydrocyclone top with a liquid inlet for accepting and directing a contaminated liquid into said hydrocyclone top;
   wherein said liquid inlet is attached to said hydrocyclone top at an angle relative to a center point in said hydrocyclone top;
   a rigid container disposed beneath said hydrocyclone top;
   a sparger in said rigid container;
   a plenum between said rigid container and said sparger;
   a source of pressured gas including ozone;
   at least one gas inlet in said rigid container in fluid communication with said source of pressurized gas and said plenum;
   wherein said sparger has a hollow interior area with an upper opening and a lower opening;
   a first reservoir in fluid communication with said lower opening of said sparger;
   a second reservoir in fluid communication with said upper opening of said sparger;

a source of negative pressure connected to said second reservoir; and a heater configured to heat the contaminated liquid prior to introduction into said liquid inlet;

an ultraviolet light source that produces ultraviolet light that is directed onto the contaminated liquid upstream of said liquid inlet;

wherein the contaminated liquid is heated by said heater prior to being exposed to the ultraviolet light; and wherein the liquid purification apparatus produces a clean liquid product from the contaminated liquid.

7. The liquid purification apparatus of claim 6, further comprising a heat exchanger for recovering said heat energy from the clean liquid product, and for recycling the heat energy to the flow of contaminated liquid.

8. The liquid purification apparatus of claim 6, wherein said source of pressurized gas comprises air, or an inert gas selected from the group consisting of carbon dioxide, nitrogen, argon, helium and a mixture thereof.

9. The liquid purification apparatus of claim 6, wherein the source of pressurized gas comprises 50-98 volume percent ozone.

10. The liquid purification apparatus of claim 6, wherein the contaminated liquid is heated to at least 82° C.

11. A liquid purification apparatus comprising:
a hydrocyclone top with a liquid inlet for accepting and directing a contaminated liquid into said hydrocyclone top;
wherein said liquid inlet is attached to said hydrocyclone top at an angle relative to a center point in said hydrocyclone top;
a rigid container disposed beneath said hydrocyclone top;
a sparger in said rigid container;
a plenum between said rigid container and said sparger;
a source of pressurized gas including ozone;
at least one gas inlet in said rigid container in fluid communication with said source of pressurized gas and said plenum;
a first reservoir beneath said sparger,
wherein said sparger has a hollow interior area in unrestricted fluid communication with said first reservoir;
a second reservoir in fluid communication with said hollow interior area of said sparger;
a vacuum pump attached to said second reservoir; and
a heater configured to heat the contaminated liquid prior to introduction into said liquid inlet;
an ultraviolet light source that produces ultraviolet light that is directed onto the contaminated liquid upstream of said liquid inlet; wherein the contaminated liquid is heated by said heater prior to being exposed to the ultraviolet light; and
wherein the liquid purification apparatus produces a clean liquid product from the contaminated liquid.

12. The liquid purification apparatus of claim 11, further comprising a heat exchanger for recovering said heat energy from the clean liquid product, and for recycling the heat energy to the flow of contaminated liquid.

13. The liquid purification apparatus of claim 11, wherein said source of pressurized gas comprises air or an inert gas selected from the group consisting of carbon dioxide, nitrogen, argon, helium and a mixture thereof.

14. The liquid purification apparatus of claim 11, wherein the source of pressurized gas comprises 50-98 volume percent ozone.

15. A liquid purification apparatus comprising:
a containment vessel having at least one rigid wall and a contaminated liquid inlet;
a source of pressurized gas containing ozone;
at least one gas inlet in fluid communication with said source of pressurized gas attached to said at least one rigid wall of said containment vessel;
wherein said containment vessel has at least one hollow area therein;
wherein said containment vessel has a first end and a second end;
a rigid substantially cylindrical microporous tube with a hollow interior and an opening at each end;
wherein said tube is positioned in said at least one hollow area of said containment vessel and hermetically sealed to said containment vessel at each of the ends of said tube;
a housing attached to said first end of said containment vessel;
wherein said housing has an interior space delimited by a substantially curved inner wall;
wherein said interior space has a center;
an aperture in said substantially curved inner wall and a fluid inlet attached to said housing at an angle relative to a center point in said housing and in fluid communication with said aperture;
a first outlet attached to said housing in fluid communication with said interior space;
a second outlet attached to said housing at a substantially perpendicular angle and in fluid communication with said interior space;
wherein said second outlet has a central axis substantially aligned with said center of said interior space;
wherein said first outlet is positioned on said housing substantially opposite said second outlet;
wherein said second outlet is in fluid communication with one opening of said tube;
a first reservoir attached to said second end of said containment vessel and in fluid communication with an end of said tube;
a fluid conduit having two ends;
wherein one of said two ends of said fluid conduit is attached to said first outlet and hermetically sealed thereto;
wherein a second end of said fluid conduit is attached to an inlet of a second reservoir and hermetically sealed thereto;
wherein said second reservoir is attached to an inlet of a venturi vacuum system; and
a heater configured to heat the contaminated liquid prior to introduction into said contaminated liquid inlet;
an ultraviolet light source that produces ultraviolet light that is directed onto the contaminated liquid upstream of said contaminated liquid inlet;
wherein the contaminated liquid is heated by said heater prior to being exposed to the ultraviolet light; and
wherein the liquid purification apparatus produces a clean liquid product from the contaminated liquid.

16. The liquid purification apparatus of claim 15, further comprising a heat exchanger for recovering said heat energy from the clean liquid product, and for recycling the heat energy to the contaminated liquid.

17. The liquid purification apparatus of claim 15, wherein said source of pressurized gas comprises air, or an inert gas selected from the group consisting of carbon dioxide, nitrogen, argon, helium and a mixture thereof.

18. The liquid purification apparatus of claim 15, wherein the source of pressurized gas comprises 50-98 volume percent ozone.

* * * * *